United States Patent [19]

Ehrig et al.

[11] 4,286,962
[45] Sep. 1, 1981

[54] PHTHALOCYANINE REACTIVE DYESTUFFS, THEIR PREPARATION AND THEIR USE FOR DYEING MATERIALS CONTAINING HYDROXYL GROUPS OR AMIDE GROUPS

[75] Inventors: Volker Ehrig, Berg.-Gladbach; Manfred Groll, Cologne; Klaus Wunderlich, Leverkusen, all of Fed. Rep. of Germany

[73] Assignee: Bayer Aktiengesellschaft, Leverkusen, Fed. Rep. of Germany

[21] Appl. No.: 108,312

[22] Filed: Dec. 31, 1979

[30] Foreign Application Priority Data

Jan. 16, 1979 [DE] Fed. Rep. of Germany ....... 2901481

[51] Int. Cl.³ .............................................. C09B 62/10
[52] U.S. Cl. .......................................... 8/549; 8/661; 8/917; 8/918; 8/919; 260/314.5; 544/181; 544/194
[58] Field of Search ............................... 544/181, 194; 260/314.5, 314; 8/549, 661, 919, 918, 917, 924

[56] References Cited

U.S. PATENT DOCUMENTS 2,219,330  10/1940  Nadler ............................... 260/314.5
4,115,378   9/1978  Bien et al. ......................... 260/146 T

FOREIGN PATENT DOCUMENTS 1208553  10/1970  United Kingdom .
1526840  10/1978  United Kingdom .

Primary Examiner—A. Lionel Clingman
Attorney, Agent, or Firm—Sprung, Felfe, Horn, Lynch & Kramer

[57] ABSTRACT

Dyestuffs of the formula

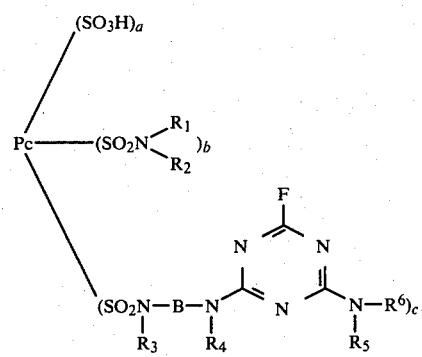

wherein
the substituents have the meaning indicated in the description, and their use for dyeing and printing materials containing hydroxyl groups or amide groups, such as textile fibres, filaments and fabrics of wool, silk or synthetic polyamide or polyurethane fibres and for dyeing and printing natural or regenerated cellulose with dyeings and prints which are fast to washing.

The dyeings obtained with the dyestuffs are distinguished by good to very good fastness properties, in particular by outstanding fastness to wet processing.

8 Claims, No Drawings

PHTHALOCYANINE REACTIVE DYESTUFFS, THEIR PREPARATION AND THEIR USE FOR DYEING MATERIALS CONTAINING HYDROXYL GROUPS OR AMIDE GROUPS

The invention relates to new water-soluble phthalocyanine dyestuffs which, in the form of their free acids, correspond to the formula

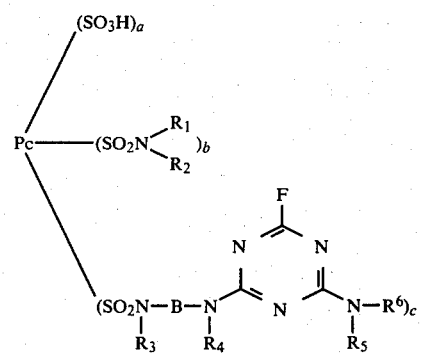

wherein
Pc the radical of a copper phthalocyanine or nickel phthalocyanine,
$R_1$ and $R_2$ H or optionally substituted alkyl, or
$R_1$ and $R_2$, together with N, forming a 5-membered or 6-membered heterocyclic ring,
$R_3$ and $R_4$ H or optionally substituted alkyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring,
B a bridge member,
a 1 to 3,
b 0 to 2,
c 1 or 2 and
$a+b+c \leq 4$,
and mixtures thereof, and to processes for their preparation and use.

In the dyestuffs of the formula (I), each sulphonic acid group or sulphonamide group is bonded, in the 3-position or 4-position, to a different benzene ring of the phthalocyanine.

The radicals $R_1$ and $R_2$, $R_3$ and $R_4$, and $R_5$ and $R_6$ can be identical or different.

Examples of optionally substituted alkyl radicals $R_1$ and $R_2$ which may be mentioned are: $C_1$–$C_5$-alkyl radicals, such as methyl, ethyl, propyl, butyl and amyl, β-hydroxyethyl and γ-hydroxypropyl and β-carboxyethyl and β-sulphoethyl.

Examples of optionally substituted alkyl radicals $R_3$ and $R_4$ are, in addition to hydrogen, $C_1$–$C_5$-alkyl radicals, such as methyl, ethyl and propyl radicals, β-hydroxyethyl and γ-hydroxypropyl.

The bridge member B can be of an aliphatic or aromatic nature. They can optionally be substituted, for example by $C_1$–$C_4$-alkyl groups, $C_1$–$C_4$-alkoxy groups and halogen atoms, and aromatic bridge members are free from carboxylic acid groups or sulphonic acid groups. They can be interrupted by keto groups, sulphone groups, carboxamido groups, urea groups, sulphonamide groups, amino groups, imino groups or oxygen atoms.

Examples of aromatic bridge members which may be mentioned are: 1,2-phenylene, 1,3-phenylene, 1,4-phenylene, 1,4-naphthylene, 1,5-naphthylene, 4-methyl-1,4-phenylene, 2-methyl-1,4-phenylene, 2-methyl-5-chloro-1,4-phenylene, 4-methoxy-1,3-phenylene, 3-methoxy-1,4-phenylene, 4-chloro-1,3-phenylene, 2-chloro-1,4-phenylene and 5-carboxamido-1,3-phenylene.

Examples of alifatic bridge members which may be mentioned are:

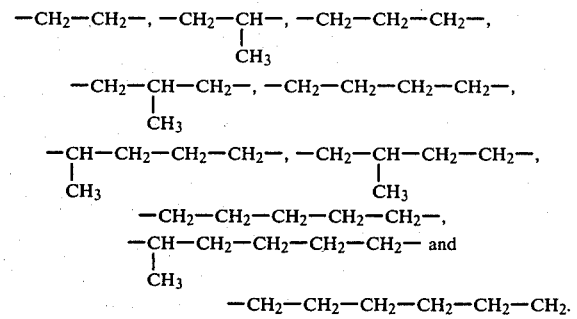

Further examples of bridge members which may be mentioned are:

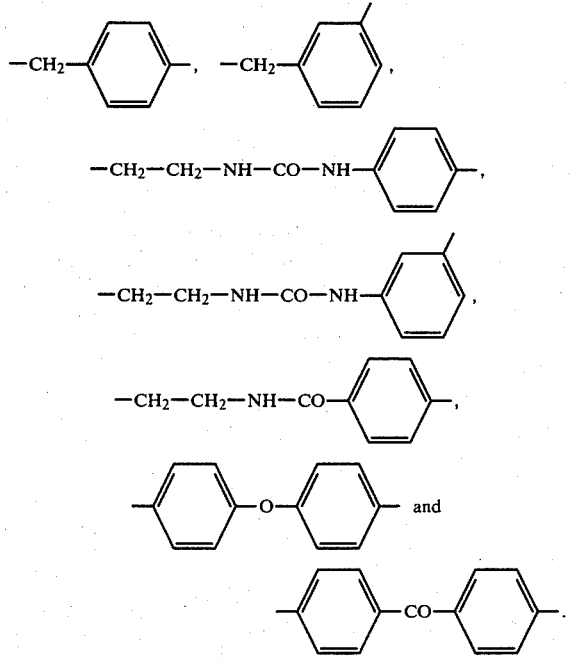

A preferred group within the dyestuffs according to the invention are those of the general formula (I) wherein
Pc the radical of a copper phthalocyanine or nickel phthalocyanine,
$R_1$, $R_2$, $R_3$ and $R_4$ hydrogen, methyl or ethyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring, B 1,2-phenylene, 1,3-phenylene, 1,4-phenylene or $C_2$–$C_6$-alkylene (straight-chain or branched), optionally substituted by $C_1$–$C_4$-alkyl groups, $C_1$–$C_4$-alkoxy groups or halogen atoms, a 1–3,
b 0–2,
c 1 and
a+b+c 2–4.

A particularly preferred group within the dyestuffs according to the invention are those of the general formula (I) wherein Pc the radical of a copper phthalocyanine or nickel phthalocyanine, $R_1$, $R_2$, $R_3$ and $R_4$ hydrogen, methyl or ethyl, $R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring, B 1,2-phenylene, 1,3-phenylene, 1,4-phenylene or $C_2$–$C_6$-alkylene (straight-chain or branched), optionally substituted by $C_1$–$C_4$-alkyl groups, $C_1$–$C_4$-alkoxy groups or halogen atoms, $1 < a < 3$,
$b > 0$,
$c = 1$ and
$a+b+c = 3$ or 4.

A particularly preferred group within the dyestuffs according to the invention are those of the general formula (I) wherein Pc the radical of a copper phthalocyanine or nickel phthalocyanine, $R_3$ and $R_4$ hydrogen, methyl or ethyl, $R_5$ and $R_6$ hydrogen, optionally alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring, B 1,2-phenylene, 1,3-phenylene, 1,4-phenylene or $C_2$–$C_6$-alkylene (straight-chain or branched), optionally substituted by $C_1$–$C_4$-alkyl groups, $C_1$–$C_4$-alkoxy groups or halogen atoms, a = 1 or 2,
b = 0,
c = 1 and
a+c = 2 or 3.

The new dyestuffs of the formula (I) are prepared by condensation of suitable starting components. The most advantageous process consists of a procedure in which dyestuffs which, in the form of their free acids, correspond to the formula

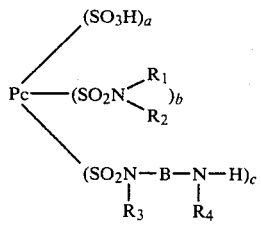

(II)

are reacted with compounds of the general formula

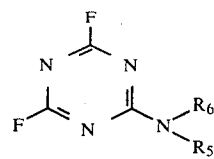

(III)

wherein

Pc, $R_1$, $R_2$, $R_3$, $R_4$, $R_5$, $R_6$, B, a, b and c have the meaning indicated above.

Examples of amines which are suitable for the preparation of the difluorotriazine derivatives III are ammonia, methylamine, dimethylamine, ethylamine, diethylamine, propylamine, butylamine, dibutylamine, isobutylamine, amylamine, β-hydroxyethylamine, γ-hydroxypropylamine, methyl-β-hydroxyethylamine, methoxyethylamine, ethoxyethylamine, N-β-hydroxyethyl-N-ethylamine, aminoacetic acid, aminopropionic acid, β-amino-ethanesulphonic acid, cyclohexylamine, 3-methylcyclohexylamine, benzylamine, aniline, 2-naphthylamine, m-toluidine, p-toluidine, 3,4-dimethylaniline, 3,5-dimethylaniline, 3-ethylaniline, 3-chloroaniline, 4-chloroaniline, 3,4-dichloroaniline, 3,5-dichloroaniline, 3-methyl-4-chloroaniline, 4-methyl-3-chloroaniline, 3-methoxyaniline, 4-methoxyaniline, 3-ethoxyaniline, 4-ethoxyaniline, 3-nitroaniline, 4-nitroaniline, 3-aminobenzoic acid amide, N-methylaniline, N-ethylaniline, 3-aminoacetanilide, 4-methylamino-acetanilide, piperidine, morpholine, o-toluidine, 2-methoxy-aniline, 2-ethoxyaniline, 2,4-dimethylaniline, 2,5-dimethylaniline and 2-chloroaniline.

The phthalocyanine compounds of the formula (II) used in the process, according to the invention, can be prepared by a procedure in which a phthalocyanine-sulphonic acid chloride of the formula

(V)

wherein

Pc has the meaning indicated above, m designates the number 0, 1 or 2 and n designates the number 2, 3 or 4, and the sum of m and n is not greater than 4, are reacted, preferably in the form of an aqueous suspension, with diamines or, preferably, monoacylated diamines of the formula

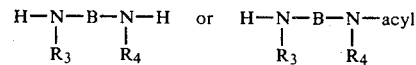

(VIa)   (VIb)

and, if appropriate, with a compound of the formula

(VII)

wherein $R_1$, $R_2$, $R_3$ and $R_4$ have the meaning indicated above, and, in the case where monoacylated diamines of the formula (VIb) are used, the terminal acylamino group of the resulting phthalocyanine compounds are subjected to acid or alkaline saponification. In this reaction, unreacted sulphonic acid chloride groups are converted into sulphonic acid groups.

Phthalocyanine-sulphonyl chlorides or phthalocyanine-(sulphonyl chloride)-sulphonic acids of the formula (V) can be obtained by a procedure in which the corresponding phthalocyanine or the phthalocyaninesulphonic acid is treated with chlorosulphonic acid and, if appropriate, an acid halide, such as thionyl chloride, phosphorus pentachloride, phosphorus oxychloride or phosphorus trichloride, as described in British Patent Specifications Nos. 708,543, 784,834 and 785,629 and in U.S. Pat. No. 2,219,330.

Phthalocyanine dyestuffs which are single compounds, that is to say those in which the letters a, b and c denote the numbers 0, 1, 2 or 3, can be used according to the invention. Moreover, however, it is also possible to use mixtures of these dyestuffs. Such mixtures sometimes show particular advantages with regard to solubility and substantivity. In such mixtures, the average value of the numbers varies.

Such mixtures according to the invention are prepared, for example, from two or more end dyestuffs of the formula (I), which are in each case single compounds, or, particularly advantageously, by using a mixture of starting components. A mixture of starting components is frequently unavoidably formed, since, on an industrial scale, the phthalocyanine-(sulphinic acid chloride)-sulphonic acids (V) are frequently obtained as mixtures with regard to the degree of sulphonation and the proportion of sulphonic acid chloride groups and sulphonic acid groups.

Examples which may be mentioned of suitable monoacylated diamines of the formula (VIb) of suitable diamines of the formula (VIa) are: 2-amino-acetanilide, 3-aminoformanilide, 3-aminoacetanilide, 4-aminoformanilide, 4-aminoacetanilide, 1-amino-4-acetylaminonaphthalene, 1-amino-5-acetyl-aminonaphthalene, 3-aminophenyloxamic acid, 4-methyl-3-aminoacetanilide, 4-methyl-3-aminophenyloxamide, 5-chloro-4-amino-2-methyl-acetanilide, 4-methoxy-3-amino-acetanilide, 4-amino-3-methoxy-acetanilide, 4-amino-2,5-dichloro-acetanilide, N-methyl-N-4-aminophenyl-acetamide, 4-amino-2-chloro-acetanilide, ethylenediamine, 1,3-propylenediamine, N-methylethylenediamine, N,N'-dimethylethylenediamine, N-(β-hydroxyethyl)-ethylenediamine, monoacetyl-1,3-propylenediamine, monoacetyl-1,4-butylenediamine, N-methyl-N-3-aminopropylacetamide, N-methyl-N-β-methylaminoethylacetamide and B-(β-aminoethyl)-N'-(3-aminophenyl)-urea.

The new dyestuffs are extremely valuable products which are suitable for the most diverse application purposes. As water-soluble compounds, they are of interest for dyeing textile materials containing hydroxyl groups or nitrogen, in particular textile materials of natural and regenerated cellulose, and furthermore of wool, silk or synthetic polyamide or polyurethane fibres. They are particularly suitable as reactive dyestuffs for dyeing cellulose materials by the techniques recently disclosed for this type of dyeing. The resulting fastness properties, in particular fastness to wet processing, are excellent.

For dyeing cellulose, the dyestuffs are preferably employed in an aqueous solution, to which alkaline substances, such as alkali metal hydroxide or alkali metal carbonate, or compounds which are converted into alkaline substances, such as alkali metal bicarbonate or $Cl_3C$—COONa, are added. Further auxiliaries can be added to the solution, but these should not react with the dyestuffs in an undesirable manner. Examples of such additives are surface-active substances, such as alkyl-sulphates, or substances which prevent migration of the dyestuff or dyeing auxiliary products, such as urea, or inert thickeners, such as oil-in-water emulsions, tragacanth, starch, alginate or methylcellulose.

The solutions or pastes thus prepared are applied, for example by padding in a padder (short liquor) or by printing, to the material to be dyed and the material is then heated to elevated temperature, preferably 40° to 150° C., for some time. The heat treatment can be carried out in a hot flue, in a steam apparatus or on heated rollers or by introducing the material into heated concentrated salt baths, and the heat treatments can be carried out either by themselves or successively in any desired sequence.

When a padding liquor or dye liquor is used without an alkali, the dry goods are subsequently passed through an alkaline solution, to which sodium chloride or sodium sulphate decahydrate is added. The addition of a salt produces migration of the dyestuff from the fibre.

It is also possible to pre-treat the material to be dyed with one of the abovementioned acid-binding agents, then to treat the material with the solution or paste of the dyestuff and finally, as indicated, to fix the dyestuff at elevated temperature.

For dyeing from a long liquor, the material is introduced into an aqueous solution of the dyestuff (liquor ratio: 1:5 to 1:40) at room temperature and dyeing is carried out for 40 to 90 minutes, the temperature being increased up to 95° C. if appropriate and, if appropriate, with the addition in portions of a salt, for example sodium sulphate, and then an alkali, for example sodium phosphates, sodium carbonate, NaOH or KOH.

The chemical reaction between the dyestuff and fibre takes place during this procedure. When the chemical fixing has taken place, the dyed material is rinsed hot and finally soaped, whereupon non-fixed residues of the dyestuff are removed. Dyeings which are outstandingly fast, especially to wet processing and light, are obtained.

In the so-called pad-cold batch process, subsequent heating of the padded fabric can be spared by storing the fabric at room temperature for some time, for example 2 to 20 hours. A stronger alkali is employed in this process than is used in the dyeing process, described above, from a long liquor.

For printing materials containing hydroxyl groups, a printing paste consisting of the dyestuff solution, a thickener, such as sodium alginate, and an alkaline compound or a compound which splits off an alkali on heating, such as sodium carbonate, sodium phosphate, potassium carbonate, potassium acetate, sodium bicarbonate or potassium bicarbonate, is used and the printed material is rinsed and soaped.

Textile materials containing amide groups, such as wool, silk or synthetic polyamide or polyurethane fibres, are in general dyed in the acid to neutral range by the dyeing methods customary for this type of dyeing.

The dyeings obtainable with the new dyestuffs are in general distinguished by good to very good fastness properties, in particular by outstanding fastness to wet processing.

EXAMPLE 1

2.8 g of aniline and 30 ml of 1 N hydrochloric acid are added to 150 ml of water, whereupon a pH value of 3.4 is established. 6.4 g of 2,4,6-trifluorotriazine are added dropwise to this solution at 0°–5° in the course of 5 minutes, whilst maintaining a pH value of 3.2–3.6 with the aid of 1 N NaHCO₃ solution, and the mixture is subsequently stirred at 0°–5° C. for a further 5 minutes, whilst maintaining the pH value indicated.

19.68 g of the dyestuff of the formula

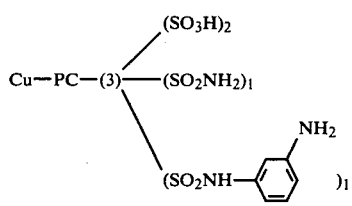

(obtained by reacting Cu-PC-(3)-(SO₂Cl/SO₃H)₄ with 3-aminoformanilide and ammonia and then saponifying the formylamino group) are dissolved, at pH 6, in 400 parts of water with the aid of sodium hydroxide solution. After cooling the solution, the difluorotriazinylaminobenzene solution obtained according to paragraph 1 is allowed to run in at 0°–5° C. in the course of 5 minutes, whilst maintaining a pH value of 6.0–6.5.

When the condensation reaction has ended, the dyestuff is salted out with KCl, filtered off, rinsed with dilute KCl solution and dried at 50°–60° C.

The dyestuff which, in the form of a K salt, corresponds to the formula

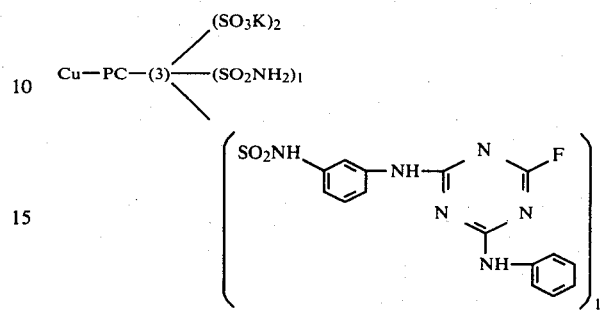

is obtained in virtually quantitative yield. It dyes cotton in turquoise blue shades.

Further valuable reactive dyestuffs are obtained in an analogous manner if the amines mentioned in column 3 of the following Table 1 are acylated with 2,4,6-trifluoro-1,3,5-triazine and the resulting difluorotriazinylamines are subjected to condensation reactions with the aminophthalicyanine derivatives of the formulae given in column 2.

TABLE 1

| No. | Aminophthalocyanine derivative | Amine | Colour shade on cotton |
|---|---|---|---|
| (1) | CuPc—(4)—(SO₃H)₂/(SO₂NH₂)₁, (SO₂NH—C₆H₃—NH₂)₁ | H₂N—C₆H₄—CH₃ | turquoise blue |
| (2) | CuPc—(3)—(SO₃H)₂/(SO₂NH₂)₁, (SO₂NH—C₆H₃—NH₂)₁ | H₂N—C₆H₄—OCH₃ | turquoise blue |
| (3) | CuPc—(3)—(SO₃H)₂, (SO₂NH—C₆H₃—NH₂)₁ | H₂N—C₆H₄—OC₂H₅ | turquoise blue |
| (4) | CuPc—(4)—(SO₃H)₂/(SO₂NH₂)₁, (SO₂NH—C₆H₃—NH₂)₁ | H₂N—C₆H₄—OC₂H₅ | turquoise blue |
| (5) | CuPc—(3)—(SO₃H)₁/(SO₂NH₂)₁, (SO₂NH—C₆H₄—NH₂)₁ | H₂N—C₆H₅ | turquoise blue |

TABLE 1-continued

| No. | Aminophthalocyanine derivative | Amine | Colour shade on cotton |
|---|---|---|---|
| (6) | CuPc—(3)—(SO$_3$H)$_2$ / (SO$_2$NH$_2$)$_1$ / (SO$_2$NH—C$_6$H$_4$—CONH—C$_6$H$_4$—NH$_2$)$_1$ | H$_2$N—C$_6$H$_4$—CH$_3$ (4-) | turquoise blue |
| (7) | CuPc—(3)—(SO$_3$H)$_2$ / (SO$_2$NH$_2$)$_1$ / (SO$_2$NH—C$_6$H$_4$—NH$_2$)$_1$ | H$_2$N—C$_6$H$_4$—OCH$_3$ (3-) | turquoise blue |
| (8) | CuPc—(3)—(SO$_3$H)$_1$ / (SO$_2$NHCH$_3$)$_1$ / (SO$_2$NH—C$_6$H$_4$—NH$_2$)$_1$ | H$_2$N—C$_6$H$_4$—C$_2$H$_5$ (3-) | turquoise blue |
| (9) | CuPc—(3)—(SO$_3$H)$_2$ / (SO$_2$N(CH$_3$)$_2$)$_1$ / (SO$_2$NH—C$_6$H$_4$—NH$_2$)$_1$ | H$_2$N—C$_6$H$_4$—OCH$_3$ (3-) | turquoise blue |
| (10) | NiPc—(3)—(SO$_3$H)$_2$ / (SO$_2$NH—C$_6$H$_4$—NH$_2$)$_1$ | H$_2$N—C$_6$H$_4$—OC$_2$H$_5$ (3-) | bluish-tinged green |
| (11) | NiPc—(3)—(SO$_3$H)$_2$ / (SO$_2$NH—C$_6$H$_4$—NH$_2$)$_1$ | H$_2$N—C$_6$H$_5$ | bluish-tinged green |
| (12) | CuPc—(3)—(SO$_3$H)$_2$ / (SO$_2$NH$_2$)$_1$ / (SO$_2$NH—C$_6$H$_4$—NH$_2$)$_1$ | H$_2$N—C$_6$H$_4$—C$_2$H$_5$ (3-) | turquiose blue |
| (13) | CuPc—(3)—(SO$_3$H)$_2$ / (SO$_2$NH—C$_6$H$_4$—NH$_2$)$_1$ | H$_2$N—C$_6$H$_5$ | turquoise blue |
| (14) | CuPc—(4)—(SO$_3$H)$_2$ / (SO$_2$NH$_2$)$_1$ / (SO$_2$NH—C$_6$H$_4$—NH$_2$)$_1$ | H$_2$N—C$_6$H$_4$—CH$_3$ (4-) | turquoise blue |

TABLE 1-continued

| No. | Aminophthalocyanine derivative | Amine | Colour shade on cotton |
|---|---|---|---|
| (15) | CuPc—(3)⟨(SO$_3$H)$_1$ / (SO$_2$NHCH$_3$)$_1$ / [SO$_2$NH—C$_6$H$_4$—NH$_2$]$_1$ | H$_2$N—C$_6$H$_4$—OCH$_3$ (meta) | turquoise blue |
| (16) | Cu—Pc—(3)⟨(SO$_3$K)$_2$ / (SO$_2$NH—CH$_2$—CH$_2$—NH$_2$)$_1$ | H$_2$N—C$_6$H$_5$ | turquoise blue |
| (17) | Cu—Pc—(3)⟨(SO$_3$K)$_2$ / (SO$_2$NH$_2$)$_1$ / (SO$_2$NH—C$_6$H$_{10}$—N(CH$_3$)H)$_1$ | H$_2$N—C$_6$H$_4$—OCH$_3$ | turquoise blue |
| (18) | Cu—Pc—(3)⟨(SO$_3$K)$_2$ / (SO$_2$NH$_2$)$_1$ / (SO$_2$N(CH$_3$)—CH$_2$—CH$_2$—N(CH$_3$)H)$_1$ | H$_2$N—C$_6$H$_4$—OC$_2$H$_5$ | turquoise blue |
| (19) | Cu—Pc—(3)⟨(SO$_3$K)$_2$ / (SO$_2$N(CH$_3$)—CH$_2$—CH$_2$—N(CH$_3$)H)$_1$ | H$_2$N—C$_6$H$_5$ | turquoise blue |
| (20) | Cu—Pc—(3)⟨(SO$_3$K)$_2$ / (SO$_2$NH$_2$)$_1$ / (SO$_2$NH—(CH$_2$)$_4$—NH$_2$)$_1$ | H$_2$N—C$_6$H$_4$—CH$_3$ | turquoise blue |
| (21) | Cu—Pc—(3)⟨(SO$_3$K)$_2$ / (SO$_2$NH—CH$_2$—CH$_2$—NH$_2$)$_1$ | H$_2$N—C$_6$H$_4$—OC$_2$H$_5$ | turquoise blue |
| (22) | Cu—Pc—(3)⟨(SO$_3$K)$_2$ / (SO$_2$NH$_2$)$_1$ / (SO$_2$NH—CH$_2$—CH$_2$—NH$_2$)$_1$ | H$_2$N—C$_6$H$_4$—CH$_3$ | turquoise blue |
| (23) | Cu—Pc—(3)⟨(SO$_3$K)$_2$ / (SO$_2$NH—CH$_2$—CH$_2$—NH$_2$)$_1$ | H$_2$N—C$_6$H$_4$—OCH$_3$ | turquoise blue |
| (24) | Cu—Pc—(3)⟨(SO$_3$K)$_2$ / (SO$_2$NH$_2$)$_1$ / (SO$_2$NH—(CH$_2$)$_3$—N(CH$_3$)H)$_1$ | H$_2$N—C$_6$H$_5$ | turquoise blue |
| (25) | Cu—Pc—(3)⟨(SO$_3$K)$_2$ / (SO$_2$NH—CH$_3$)$_1$ / (SO$_2$NH—CH$_2$—CH$_2$—NH$_2$)$_1$ | H$_2$N—C$_6$H$_4$—CH$_3$ | turquoise blue |

EXAMPLE 2

19.02 g of the dyestuff of the formula

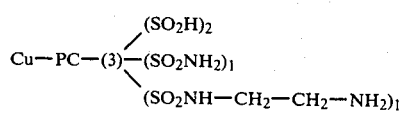

(obtained by reacting Cu-PC-(3)-(SO$_2$Cl/SO$_3$H)$_4$ with monoacetylethylenediamine and ammonia and then saponifying the acetylamino group) are dissolved, at pH 8.5, in 300 ml of water with the aid of sodium hydroxide solution. 4 g of 2,4-difluoro-6-methylamino-1,3,5-triazine are then added at 20° C. and at pH 8.5 in the course of 5 minutes.

When the condensation reaction has ended, the pH value of the solution is adjusted to 6 and the dyestuff is salted out with KCl, filtered off, rinsed with dilute KCl solution and dried at 50°–60° C. The dyestuff which, in the form of its K salt, corresponds to the formula

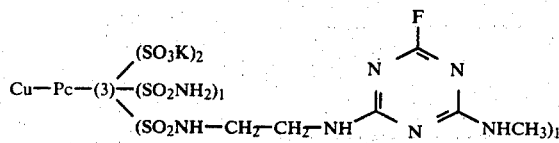

is obtained in very good yield. The dyestuff dyes cotton in turquoise blue shades.

Further valuable reactive dyestuffs are obtained in an analogous manner if the aminophthalocyanine derivatives of the formulae given in column 2 of the following Table 2 are subjected to condensation reactions with difluorotriazinyl compounds of the formula

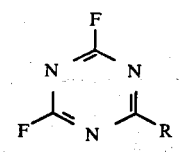

wherein
R has the meaning indicated in column 3.

TABLE 2

| No. | Aminophthalocyanine derivative | R | Colour shade on cellulose |
|---|---|---|---|
| (1) | Cu—Pc—(3)⟨(SO$_3$K)$_2$ / (SO$_2$NH—CH$_2$—CH$_2$—NH$_2$)$_1$ | —N(CH$_3$)$_2$ | turquoise blue |
| (2) | Cu—Pc—(3)⟨(SO$_3$K)$_2$ / (SO$_2$NH$_2$)$_1$ / (SO$_2$NH—⌬—NH)$_1$ CH$_3$ | HN—CH$_2$CH$_2$—OH | turquoise blue |
| (3) | Cu—Pc—(3)⟨(SO$_3$K)$_2$ / (2NH$_2$)$_1$ / (SO$_2$N—CH$_2$—CH$_2$—N—H)$_1$ CH$_3$  CH$_3$ | HN—CH$_2$CH$_2$OCH$_3$ | turquoise blue |
| (4) | Cu—Pc—(3)⟨(SO$_3$K)$_2$ / (SO$_2$N—CH$_2$—CH$_2$—N—H)$_1$ CH$_3$  CH$_3$ | —N(C$_4$H$_9$)$_2$ | |
| (5) | Cu—Pc—(3)⟨(SO$_3$K)$_2$ / (SO$_2$NH$_2$)$_1$ / (SO$_2$NH—(CH$_2$)$_4$—NH$_2$)$_1$ | HNCH$_2$COOH | |
| (6) | Cu—Pc—(3)⟨(SO$_3$K)$_2$ / (SO$_2$NH—CH$_2$—CH$_2$—NH$_2$)$_1$ | —N(C$_2$H$_5$)$_2$ | turquoise blue |
| (7) | Cu—Pc—(3)⟨(SO$_3$K)$_2$ / (SO$_2$NH$_2$)$_1$ / (SO$_2$NH—CH$_2$—CH$_2$—NH$_2$)$_1$ | —N(C$_6$H$_5$) | turquoise blue |
| (8) | Cu—Pc—(3)⟨(SO$_3$K)$_2$ / (SO$_2$NH—CH$_2$—CH$_2$—NH$_2$)$_1$ | —N(CH$_2$CH$_2$OH)$_2$ | turquoise blue |
| (9) | Cu—Pc—(3)⟨(SO$_3$K)$_2$ / (SO$_2$NH$_2$)$_1$ / (SO$_2$NH—(CH$_2$)$_3$—N—H)$_1$ CH$_3$ | HNCH$_2$CH$_2$—OSO$_3$H | turquoise blue |
| (10) | Cu—Pc—(3)⟨(SO$_3$K)$_2$ / (SO$_2$NH—CH$_3$)$_1$ / (SO$_2$NH—CH$_2$—CH$_2$—NH$_2$)$_1$ | HNCH$_2$CH$_2$·SO$_3$H | turquoise blue |
| (11) | CuPc—(4)⟨(SO$_3$H)$_2$ / (SO$_2$NH$_2$)$_1$ / (SO$_2$NH—⌬—NH$_2$)$_1$ | —N(CH$_3$)$_2$ | turquoise blue |

TABLE 2-continued

| No. | Aminophthalocyanine derivative | R | Colour shade on cellulose |
|---|---|---|---|
| (12) | CuPc—(3)—(SO$_3$H)$_2$ / (SO$_2$NH$_2$)$_1$ / (SO$_2$NH—C$_6$H$_4$—NH$_2$)$_1$ | H N(CH$_3$)— | turquoise blue |
| (13) | CuPc—(3)—(SO$_3$H)$_2$ / (SO$_2$NH—C$_6$H$_4$—NH$_2$)$_1$ | —N(C$_2$H$_5$)$_2$ | turquoise blue |
| (14) | CuPc—(4)—(SO$_3$H)$_2$ / (SO$_2$NH$_2$)$_1$ / (SO$_2$NH—C$_6$H$_4$—NH$_2$)$_1$ | —N(C$_4$H$_9$)$_2$ | turquoise blue |
| (15) | CuPc—(3)—(SO$_3$H)$_1$ / (SO$_2$NH$_2$)$_1$ / (SO$_2$NH—C$_6$H$_4$—NH$_2$)$_1$ | H N—CH$_2$CH$_2$—OH | turquoise blue |
| (16) | CuPc—(3)—(SO$_3$H)$_2$ / (SO$_2$NH$_2$)$_1$ / (SO$_2$NH—C$_6$H$_4$—CONH—C$_6$H$_4$—NH$_2$)$_1$ | H N—CH$_2$CH$_2$—OCH$_3$ | turquoise blue |
| (17) | CuPc—(3)—(SO$_3$H)$_2$ / (SO$_2$NH$_2$)$_1$ / (SO$_2$NH—C$_6$H$_4$—NH$_2$)$_1$ | H N—CH$_2$COOH | turquoise blue |
| (18) | CuPc—(3)—(SO$_3$H)$_1$ / (SO$_2$NHCH$_3$)$_1$ / (SO$_2$NH—C$_6$H$_4$—NH$_2$)$_1$ | H N—CH$_2$CH$_2$—SO$_3$H | turquoise blue |
| (19) | CuPc—(3)—(SO$_3$H)$_2$ / (SO$_2$N(CH$_3$)$_2$)$_1$ / (SO$_2$NH—C$_6$H$_4$—NH$_2$)$_1$ | —N(CH$_3$)$_2$ | turquoise blue |
| (20) | NiPc—(3)—(SO$_3$H)$_2$ / (SO$_2$NH—C$_6$H$_4$—NH$_2$)$_1$ | H N(CH$_3$)— | bluish-tinged green |

TABLE 2-continued

| No. | Aminophthalocyanine derivative | R | Colour shade on cellulose |
|---|---|---|---|
| (21) | NiPc—(3) $\diagdown$ (SO$_3$H)$_2$ / [SO$_2$NH—C$_6$H$_4$—NH$_2$]$_1$ (meta) | —N(CH$_2$CH$_2$OH)$_2$ | bluish-tinged green |
| (22) | CuPc—(3)—(SO$_2$NH$_2$)$_1$ / (SO$_3$H)$_2$ \ [SO$_2$NH—C$_6$H$_4$—NH$_2$]$_1$ (meta) | $\overset{CH_3}{\underset{CH_2CH_2OH}{N}}$ | turquoise blue |
| (23) | CuPc—(3) $\diagdown$ (SO$_3$H)$_2$ / [SO$_2$NH—C$_6$H$_4$—NH$_2$]$_1$ (para) | $\overset{CH_3}{\underset{CH_2CH_2OCH_3}{N}}$ | turquoise blue |
| (24) | CuPc—(4)—(SO$_2$NH$_2$)$_1$ / (SO$_3$H)$_2$ \ [SO$_2$NH—C$_6$H$_4$—NH$_2$]$_1$ (meta) | —N(CH$_2$CH$_2$OCH$_3$)$_2$ | turquoise blue |
| (25) | CuPc—(3)—(SO$_2$NHCH$_3$)$_1$ / (SO$_3$H)$_1$ \ [SO$_2$NH—C$_6$H$_4$—NH$_2$]$_1$ (para) | H NCH$_2$CH$_2$OSO$_3$H | turquoise blue |
| (26) | CuPc—(3) $\diagdown$ (SO$_3$H)$_2$ / [SO$_2$NH—C$_6$H$_4$—NH$_2$]$_1$ (meta) | H NCH$_2$—C$_6$H$_5$ | turquoise blue |
| (27) | CuPc—(3)—(SO$_2$NH$_2$)$_1$ / (SO$_3$H)$_2$ \ [SO$_2$NH—C$_6$H$_4$—NH$_2$]$_1$ (meta) | H NCH(CH$_3$)$_2$ | turquoise blue |

DYEING EXAMPLE 1

220 ml of water of 20°–25° C. are initially introduced into a dye beaker which has a capacity of 500 ml and is in a water bath which can be heated. 0.3 g of the dyestuff obtained according to Example 1, paragraph 2, is mixed thoroughly with 2 ml of cold water to form a paste and 48 ml of hot water (70° C.) are added. The dyestuff solution, with a pH value of 7–8, is added to the initially introduced water, and 10 g of cotton yarn are kept continuously moving in this dye liquor. The temperature of the dye liquor is increased to 60° C. in the course of 10 minutes, 15 g of sodium sulphate (anhydrous) are added and dyeing is continued for 30 minutes. 2 g of sodium carbonate are then added to the dye liquor and dyeing is carried out at 60° C. for 60 minutes. The dyed material is then taken out of the dye liquor, the adhering liquor is removed by wringing out or pressing off and the material is rinsed thoroughly, first with cold water and then with hot water until the rinsing liquor is no longer stained. The dyed material is then soaped at the boiling point for 20 minutes in 500 ml of a liquor which contains 0.5 g of a sodium alkylsulphonate, rinsed again and dried at 60°–70° C. in a drying cabinet. The cotton is dyed in a clear turquoise blue shade which is fast to wet processing.

DYEING EXAMPLE 2

3 g of the dyestuff obtained according to Example 1, paragaph 2, are stirred with 5 g of urea and 1 g of sodium m-nitrobenzene-sulphonate, the components are mixed thoroughly with 10 ml of water of 20°–25° C. to form a paste and the paste is dissolved, at pH 7–8, in 80 ml of water of 20° C., whilst stirring. 20 ml of a 10% strength sodium carbonate solution are added to this solution. Using the padding liquor thus obtained, 20 g of cotton fabric are padded on a laboratory padder, the rollers of which are pressed against one another with a pressure such that the liquor pick-up of the cotton fabric is about 80% of its dry weight. The fabric thus padded is put on a stenter, dried at 60°–70° C. in a drying cabinet for 15 minutes and then steamed at 102° C. for 3 minutes. The dyed material is then rinsed thoroughly, first with cold water and then with hot water, until the rinsing liquor is no longer stained. The dyed material is then soaped at the boiling point for 20 minutes in 500 ml of a liquor which contains 0.5 g of a sodium alkyl-sulphonate, rinsed again and dried at 60°–70° C. in a drying cabinet.

The dyestuff is absorbed in a clear, turquoise blue shade which is fast to wet processing.

DYEING EXAMPLE 3

20 g of wool hanks are introduced, at 40° C., into a dyebath which consists of 0.5 g of the dyestuff obtained according to Example 1, paragraph 2 (dissolved at pH 7–8), 3.0 g of a polyglycol ether prepared according to DAS (German Published Specification) No. 1,041,003, Example 9, 5.0 g of sodium sulphate and 1.2 g of 30% strength acetic acid per liter, and the bath is warmed to 80° C. in the course of 15 minutes. The bath is left at this temperature for 30 minutes, then warmed to the boiling point and this temperature is maintained for about one hour. After rinsing with water, a turquoise blue dyeing which fast to potting and milling is obtained.

PRINTING EXAMPLE

A piece of cotton is printed with a printing paste consisting of 50 g of the dyestuff of Example 1, paragraph 2, 150 g of urea, 20 g of sodium bicarbonate, 10 g of sodium m-nitrobenzene-sulphonate, 450 g of a highly viscous alginate thickener and 320 g of water and is steamed at 103° C. in a steamer, for example of the Mather-Platt type. The print is then rinsed with cold water, then with hot water and finally again with cold water. A turquoise blue print which is fast to wet processing is obtained.

We claim:

1. Phthalocyanine reactive dyestuffs of the formula $$Pc \begin{pmatrix} (SO_3H)_a \\ (SO_2N\begin{smallmatrix}R_1\\R_2\end{smallmatrix})_b \\ (SO_2N-B-N\begin{smallmatrix}\\R_3\end{smallmatrix}\begin{smallmatrix}\\R_4\end{smallmatrix}-C(=N)-N=C(F)-N(R_5)-R^6)_c \end{pmatrix}$$

wherein
Pc the radical of a copper phthalocyanine or nickel phthalocyanine,
$R_1$ and $R_2$ H or optionally substituted alkyl, or $R_1$ and $R_2$, together with N, forming a 5-membered or 6-membered heterocyclic ring,
$R_3$ and $R_4$ H or optionally substituted alkyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring, B a bridge member selected from the group consisting of

[structures: 1,4-phenylene, 1,3-phenylene, 1,2-phenylene with methyl, $-CH_2-C_6H_4-$, $-CH_2-C_6H_4(CH_3)-$, $-CH_2-CH_2-NH-CO-NH-C_6H_4-$, $-CH_2-CH_2-NH-CO-NH-C_6H_4(CH_3)-$, $-CH_2-CH_2-NH-CO-C_6H_4-$, $-C_6H_4-O-C_6H_4-$ and $-C_6H_4-CO-C_6H_4-$,]

$a = 1$ to 3,
$b = 0$ to 2,
$c = 1$ or 2 and
$a + b + c \leq 4$.

2. Phthalocyanine reactive dyestuffs of the formula wherein
Pc the radical of a copper phthalocyanine or nickel phthalocyanine,
$R_1$, $R_2$, $R_3$ and $R_4$ hydrogen, methyl or ethyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring,
B 1,2-phenylene, 1,3-phenylene or 1,4-phenylene optionally substituted by $C_1$–$C_4$-alkyl groups, $C_1$–$C_4$-alkoxy groups or halogen atoms,
$a = 1$–3,
$b = 0$–2,
$c = 1$ and
$a + b + c = 2$–4.

3. Phthalocyanine reactive dyestuffs of the formula

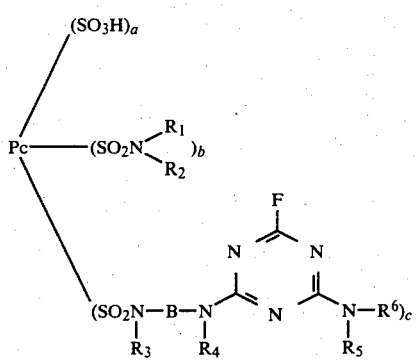

wherein
Pc the radical of a copper phthalocyanine or nickel phthalocyanine,
$R_1$, $R_2$, $R_3$ and $R_4$ hydrogen, methyl or ethyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or
$R_5$ and $R_6$, together with N, a 5-membered or 6-membered heterocyclic ring,
B 1,2-phenylene, 1,3-phenylene or 1,4-phenylene optionally substituted by $C_1$-$C_4$-alkyl groups, $C_1$-$C_4$-alkoxy groups or halogen atoms,
$1 < a < 3$,
$b > 0$,
$c = 1$ and
$a + b + c = 3$ or 4.

4. Phthalocyanine reactive dyestuffs of the formula

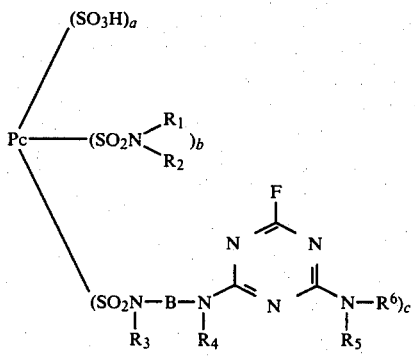

wherein
Pc the radical of a copper phthalocyanine or nickel phthalocyanine,
$R_1$–$R_4$ hydrogen, methyl or ethyl,
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered heterocyclic ring,
B 1,2-phenylene, 1,3-phenylene or 1,4-phenylene, optionally substituted by $C_1$-$C_4$-alkyl groups, $C_1$-$C_4$-alkoxy groups or halogen atoms,
$a = 1$ or 2,
$b = 0$,
$c = 1$ and
$a + c = 2$ or 3.

5. Process for the preparation of phthalocyanine reactive dyestuffs, characterised in that phthalocyanine dyestuffs, containing amino groups, of the formula

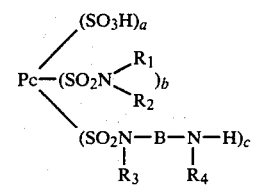

wherein
Pc denotes the radical of a copper phthalocyanine or nickel phthalocyanine,
$R_1$ and $R_2$ denote H or optionally substituted alkyl, or $R_1$ and $R_2$, together with N, form a 5-membered or 6-membered heterocyclic ring,
$R_3$ and $R_4$ denote H or optionally substituted alkyl,
B denotes a bridge member selected from the group consisting of

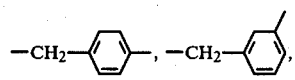

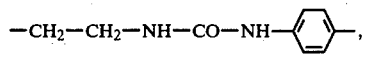

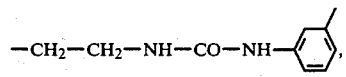

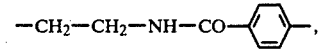

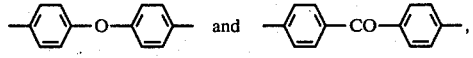

a denotes 1 to 3,
b denotes 0 to 2,
c denotes 1 to 2 and
$a + b + c \leq 4$,
are reacted with c mols of a compound of the formula

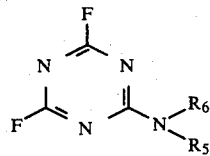

wherein
$R_5$ and $R_6$ hydrogen, optionally substituted alkyl with 1 to 5 C atoms, optionally substituted cycloalkyl or aralkyl or an optionally substituted aryl radical which is free from sulphonic acid groups and carboxylic acid groups, or $R_5$ and $R_6$, together with N, a 5-membered or 6-membered ring.

6. A method for dyeing and printing materials containing hydroxyl groups or nitrogen, which comprises applying to said materials a dyestuff of claim 1 or 2.

7. Materials which contain hydroxyl groups or nitrogen and are dyed or printed with the dyestuffs of any one of claims 1 to 4.

8. A method of claim 6 in which the materials are textile materials of natural or regenerated cellulose.

* * * * *